United States Patent

Lardon et al.

[11] 3,994,592
[45] Nov. 30, 1976

[54] METHOD OF DETERMINING THE CONCENTRATION RATIO OF TWO SUBSTANCES

[75] Inventors: Marcel A. Lardon, Maienfeld, Switzerland; Thaddäus Kraus, Triesen, Liechtenstein

[73] Assignee: Balzers Patent und Beteiligungs AG, Liechtenstein

[22] Filed: Nov. 10, 1975

[21] Appl. No.: 630,520

[30] Foreign Application Priority Data
Nov. 20, 1974 Switzerland.................... 15601/74

[52] U.S. Cl. .................................. 356/178; 356/97; 356/179; 356/181; 356/184; 356/189
[51] Int. Cl.² ............................................ G01J 3/46
[58] Field of Search ............ 356/97, 178, 179, 181, 356/184, 189

[56] References Cited
UNITED STATES PATENTS
3,211,051   10/1965   Frei et al. ............................ 356/97

Primary Examiner—Vincent P. McGraw
Attorney, Agent, or Firm—McGlew and Tuttle

[57] ABSTRACT

The concentration ratio of two components of a mixture of substances, having absorption bands which are adjacent each other in a manner such that the radiation absorption of the mixture of substances has a minimum between these absorption bands, is determined by measuring, in three adjacent, narrow spectral regions, of the radiation transmitted by the mixture of substances, a variable which is proportional to the ratio $\Delta^1 I / \Delta^2 I$ wherein the numerator $\Delta^1 I = (I_3 - I_1)$ is the difference between the intensities of radiation of the two outer spectral regions, and the denominator $\Delta^2 I = (I_3 - I_2) - (I_2 - I_1)$ is the value by which the respective differences between the intensities of radiation of each outer spectral region and the middle spectral region differ from each other. The position, in the spectrum, of the three adjacent regions is adjusted so that they are located between the absorption maxima of the two components and where the numerator $\Delta^1 I$ becomes zero at a definite concentration ratio which is preferably the ratio at which the highest accuracy of measurement is desired. Alternatively, the variable is proportional to the ratio $I'/I''$, which is the ratio of the first derivative $I'$ to the second derivative $I''$ of the distribution of spectral intensity.

6 Claims, 6 Drawing Figures 3,994,592

METHOD OF DETERMINING THE CONCENTRATION RATIO OF TWO SUBSTANCES

FIELD AND BACKGROUND OF THE INVENTION

In the known methods of quantitative analysis, with one measurement, only the quantity of a single component in a given volume is determined, such as the mass density or numerical particle density of the respective substance. If, however, there is no need for knowing the quantity of the substance but only the proportion thereof relative to the quantity of another component present in the given volume, the measurement either must be carried out under well-defined conditions (for example, control the temperature or pressure, or removing accompanying substances) or must be complemented by another measurement.

Determining the concentration ratio of two components of a mixture of substances is a problem which is posed very often. That is, in almost all chemical reactions, it matters to observe definite concentration ratios, in the chemical technology, not least for reasons of economy. But also in many other fields, the concentration ratio is determinative, sometimes even in cases where it is not manifest at first sight, of which examples will be given hereinafter.

SUMMARY OF THE INVENTION

The present invention is directed to a method of measuring the concentration ratio of two components of a mixture of substances, making it possible to determine the concentration ratio directly, by means of a single measured variable and under any measuring conditions, and not requiring to keep constant other influencing quantities such as the temperature, the pressure, the rate of flow and the concentration of one of the components or the total concentration of the two components.

It has been found that this objective is attainable and concentration ratios of two substances in a mixture can be determined in this manner, if the absorption bands of the two substances are spaced from each other by a relatively small distance.

An object of the invention is to provide an improved method of measuring the concentration ratio of two components of a mixture of substances.

Another object of the invention is to provide such a method in which it is possible to determine the concentration ratio directly by means of a single measured variable and under any measuring conditions.

A further object of the invention is to provide such a method which does not require keeping constant other influencing quantities such as temperature, pressure, rate of flow and the like.

For an understanding of the principles of the invention, reference is made to the following description of typical embodiments thereof as illustrated in the accompanying drawings.

DESCRIPTION OF THE PREFERRED EMBODIMENTS

Figure 1:
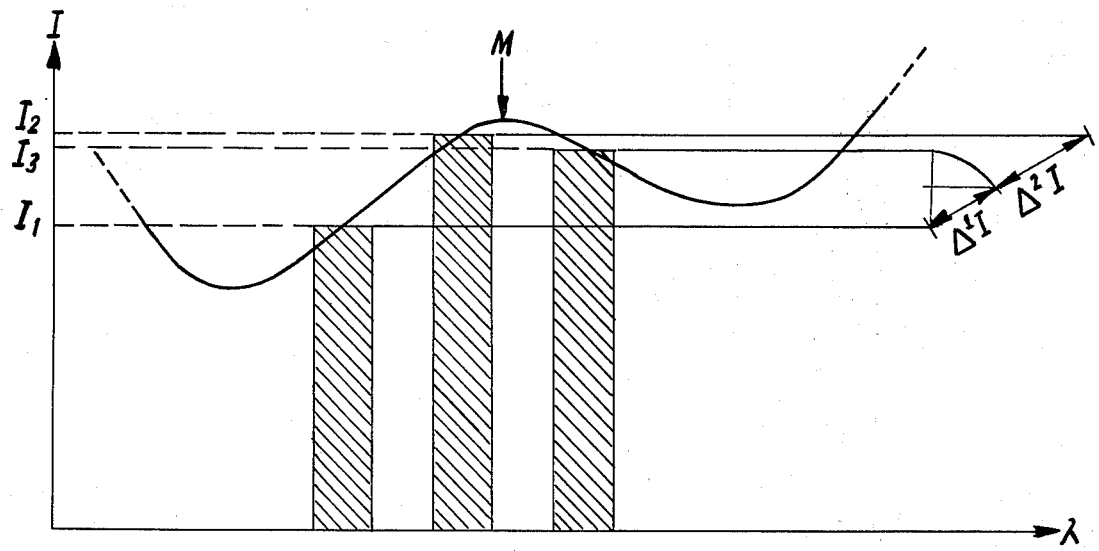
FIG. 1 is a graphic illustration of the underlying principle of the invention method.

In accordance with the invention, a method of determining the concentration ratio of two components of a mixture of substances, having absorption bands which are adjacent each other in a manner such that the radiation absorption of the mixture of substances has a minimum between these absorption bands, comprises measuring, in three adjacent, narrow, spectral regions of the transmitted radiation, of a variable which is proportional to a ratio $\Delta^1 I/\Delta^2 I$ wherein the numerator $\Delta^1 I = (I_3 - I_1)$ is the difference between the intensities of radiation of the two outer spectral regions and the denominator $\Delta^2 I = (I_3 - I_2) - (I_2 - I_1)$ is the value by which the respective differences between the intensities of radiation of each of the outer and the middle spectral regions differ from each other. This variable is used as a measure for the concentration ratio. The position, in the spectrum, of the three adjacent regions is adjusted so that they are located between the absorption maxima of the two components and that the first difference $\Delta^1 I$ becomes zero at a definite concentration ratio, preferably, at a ratio at which the highest accuracy of measurement is desired (see FIG. 1).

Initially, the transmitted radiation is split up into narrow spectral regions, for example, by means of prism or grating monochromators or interference filters. The obtained spectral regions are characterized by the spectral position of the transmission maximum and by the so-called half-width value. The half-width value of a spectral region should not exceed approximately one-third of the interval in which the ratio $\Delta^1 I/\Delta^2 I$ of the first to the second difference is measured.

The measurement can be carried out so that the radiation, split up into different spectral regions, is directed either simultaneously to three different radiation receivers or consecutively to a single radiation receiver. In the last-mentioned case, the position in the spectrum of the transmission maximum may change non-sequentially or continuously, for example, in accordance with a sine function.

The intensities of radiation of the different spectral regions are converted by the radiation receivers (for example, photoelectric cells, thermocouples, bolometers) into electric quantities. Therefrom, by means of amplifiers and rectifiers, there is obtained, initially, values which are proportional to the second difference and, further, by means of also well-known electronic circuits, there is obtained a value which is proportional to the ratio $\Delta^1 I/\Delta^2 I$.

If the interval through which the measurement is carried out becomes very narrow, the first difference $\Delta^1 I$ changes in the first differential $d^1 I$ and the second difference $\Delta^2 I$ changes in the second differential $d^2 I$. However, within a given interval, the ratio $d^1 I/d^2 I$ of the first to the second differential is proportional to the ratio $I'/I''$ of the first derivative $I'$ to the second derivative $I''$.

In accordance with the invention, another version of the method of determining the concentration ratio of two components of a mixture of substances, having absorption bands which are adjacent each other in a manner such that the radiation absorption of the mixture of substances has a minimum between these absorption bands, comprises measuring, in the radiation transmitted by the mixture of substances to be examined, a variable which is proportional to the ratio $I'/I''$ of the first derivative $I'$ to the second derivative $I''$ of the spectral distribution of the intensities, and using this variable as a measure for the concentration ratio. In this case, the measurement is carried out between the absorption maxima of the two components at such a location of the spectrum where, at a definite concentration ratio, preferably, the ratio at which the highest accuracy of measurement is desired, the first derivative $I'$ becomes zero.

In this case, in a well-known manner, there can be obtained, from the alternating currents obtained by modulation of the spectral position of the radiation incident on a light-electric receiver, electric values which, initially, are proportional to the first derivative $I'$, then to the second derivative $I''$, and, finally, to the ratio $I'/I''$.

In a by far greater part of the spectrum, the measured variables $\Delta^1 I/\Delta^2 I$ as well as $I'/I''$ depend upon the total quantity of the two components in the beam path and, therefore, are unsuitable for the desired purpose of determining the concentration ratio independently of the total concentration of the two components. However, surprisingly, the influence of the total quantities of the two components present in the beam path on the measured variable $\Delta^1 I/\Delta^2 I$ or $I'/I''$ is very small in the spectral region between the absorption maxima of the two components, and disappears completely as soon as the measured variable passes through zero. The zero passage of the measured variable corresponds to a definite value of the concentration or quantity ratio of the two absorbing components and is independent of the absolute quantity of the substances in the beam path. Consequently, in the vicinity of the zero passage, the determination of the concentration ratio based on the measured variables $\Delta^1 I/\Delta^2 I$ or $I'/I''$ is particularly accurate.

Thus, it is advantageous to choose the spectral region of the measurement so that, at the concentration ratio at which the highest accuracy of measurement is required, the first difference $\Delta^1 I$, or the first derivative $I'$ becomes zero, wherefore the measured variables $\Delta^1 I/\Delta^2 I$ and $I'/I''$ also pass through zero at this concentration ratio.

To find this spectral region rapidly and without a long testing, a mixture of substances is prepared containing the two components in the exact concentration ratio which is desired and, with the aid of a spectrophotometer, the spectral position of the absorption minimum of the mixture is determined, which is located between the absorption maxima of the two components. The spectral position of the filters or monochromators for measuring the ratio $\Delta^1 I/\Delta^2 I$ or $I'/I''$ is chosen correspondingly. A fine adjustment of the spectral region can be made later on the measuring instrument itself, for example, with prism or grating monochromators, by displacing the slit, or, with interference filters, by adjusting the angle of incidence, so that an exact zero value is obtained for the variable $\Delta^1 I/\Delta^2 I$ or $I'/I''$ at the desired concentration ratio.

An example of application of the invention method is the determination of the degree of dissociation. It is well known that a variation of the degree of dissociation of weak electrolytes causes strong variations of their optical properties. This makes it possible, inversely, to use the optical variations for determining the actual degree of dissociation of weak electrolytes, as far as the substances participating in the dissociation equilibrium have sufficiently different optical properties. For light absorption in definite spectral regions, this is almost always the case. Such substances are designated as indicators. The measuring of the degree of dissociation of indicators can be used not only for determining the equivalence point in acidimetric titrations but also for pH measurements within the end-point region of the indicator. By end-point region, there is understood the pH region in which a large percentage of the indicator has changed color, since the acid-to-base ratio of the indicator depends on the pH of the solution. This ratio can be determined, for example, by a mixed-color colorimeter. It is true that the general usefulness of the measuring of the degree of dissociation for determining the pH value is impaired by the fact that it is not the measured concentration ratio but the ratio of activities which depends on the pH of the solution. This causes the so-called "salt error" of the colorimetric pH measurement and for this reason, in most cases, electrometric measuring is preferred. However, because of the difficulties opposing the electrometric pH measurement in concentrated solutions or non-aqueous solvents, the acidity in such media is frequently measured colorimetrically with the aid of indicators, in spite of the mentioned drawbacks.

The inventive method may also be used for adjusting the degree of dissociation to a predetermined value or for keeping it constant by means of a control circuit, as described in the following example.

The purpose was to adjust the degree of dissociation $\alpha$ of glutamic acid in aqueous ethanol solution (72% of ethanol) to the value of $\alpha = 0.5$ (region of best buffering). To this end, NaOH had to be added to the glutamic acid, having a thermodynamic dissociation constant of which the negative logarithm is $p_K = 5.65$, until the negative logarithm of the hydrogen ion activity was brought to a value $pH = p_K$, thus $pH = 5.65$. For determining this pH value, methyl red was added to the solution as indicator.

Figure 2:
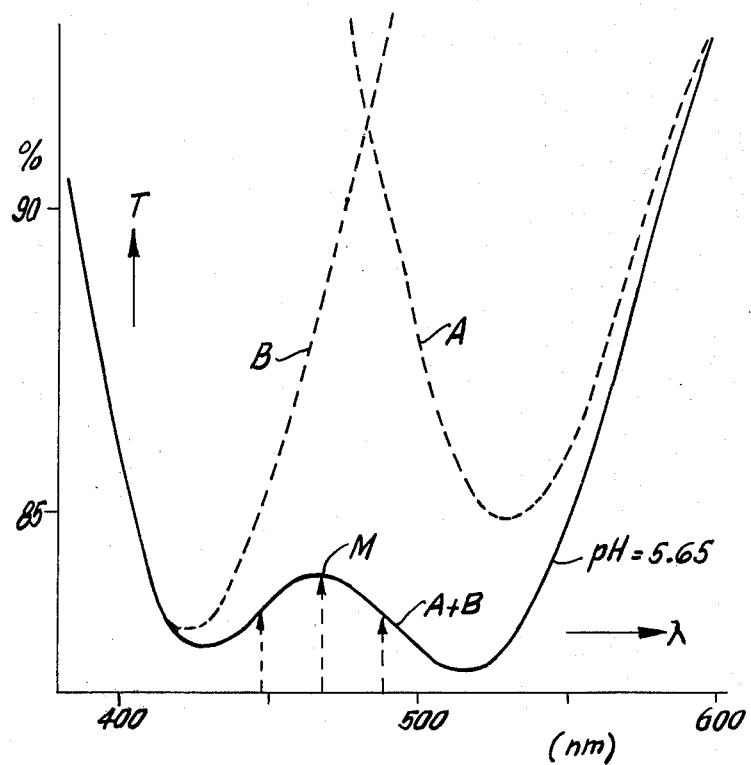
FIG. 2 is a graph of the transmission characteristic of methyl-red solutions at a pH value of 5.65.

At a pH value of 5.65, methyl-red solutions have a transmission characteristic which is shown in FIG. 2 and has a maximum M between the absorption bands of the acid form (curve A) and the basic form (curve B) of the indicator.

For carrying out the method, three photoelectric cells, preceded by narrow-band interference filters (the wavelengths of the transmission maxima were 448 nm, 468 nm and 488 nm), were arranged side by side in the beam path and connected to amplifiers, and a digital voltmeter with a known circuitry was used for indicating a value proportional to the quotient $\Delta^1 I/\Delta^2 I$.

Initially, with a solution containing no indicator, the amplifiers were equalized until the indication of a value zero was obtained. Then, a solution, which had been adjusted exactly to $pH = 5.65$ and colored with methyl red, was brought into the beam path. By displacing the spectral position of the transmission region of the interference filters by means of the angle of incidence, the measured value $\Delta^1 I/\Delta^2 I$ was again adjusted exactly to zero. Thereupon, any glutamic acid solution, also containing methyl red, could be adjusted to the desired degree of dissociation $\alpha = 0.5$ by adding NaOH solution until the measured value, proportional to the quotient $\Delta^1 I / \Delta^2 I$, was zero.

Figure 3:
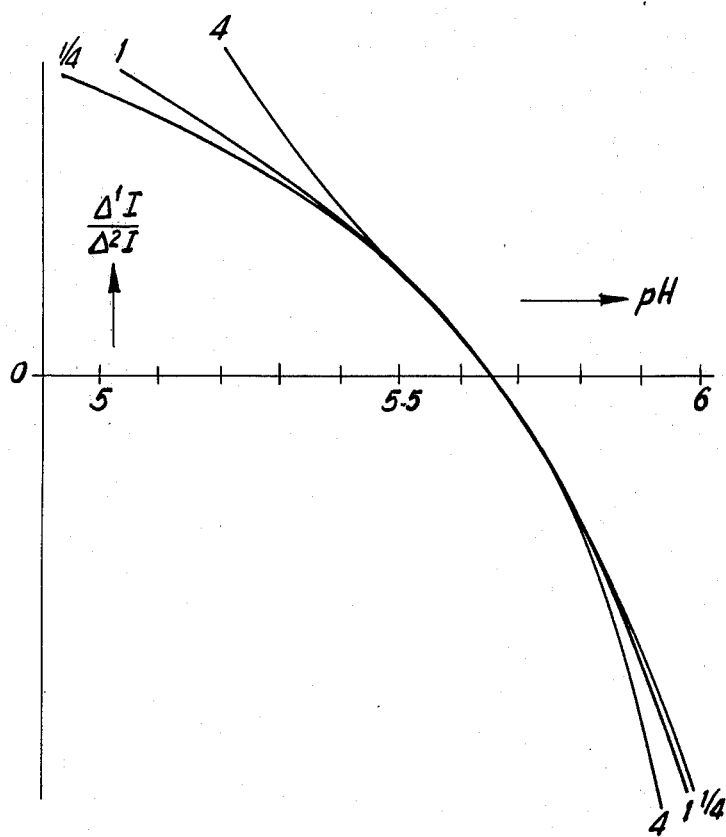
FIG. 3 is a graph illustrating the relation between the measured variable and the pH values for different indicator additions.

The quantity of the added indicator has no influence on the measurement of this pH value. FIG. 3 shows the relation between the measured variable $\Delta^1 I / \Delta^2 I$ and the pH values for different indicator additions: $\frac{1}{4} \cdot 10^{-8}$, $1 \cdot 10^{-8}$ and $4 \cdot 10^{-8}$ (mol/cm$^3$ of methyl red). As may be seen in the graph of FIG. 3, in the zone between pH = 5.5 and pH = 5.8, the measuring is completely independent of the indicator addition. As compared to the known colorimetric measuring methods, this, as well as the easily possible mounting into automatic controls or control loops, is a great advantage. For an exact adjustment of other pH values, it is necessary to correspondingly change the position of the measuring range and, as the case may be, also the indicator.

Similar measurements may also be carried out in the ultraviolet range where they permit, for example, in connection with light microscopy, the determination of nucleic acids and of the albumin distribution in the cell structure.

Another example of application of the inventive method is the testing of carbon monoxide emission during the no-load run of engines with external ignition. The content of carbon monoxide of exhaust gases emitted during idle running must not exceed 4.5% by volume[1].

[1] Articles 5.2.1.2.2 and 5.2.1.2.3, test type II, of the Regulations No. 1 to the International Geneva Agreement of March 20, 1958 concerning the adoption of uniform conditions for the approval of articles of equipment and parts of motor vehicles and the mutual acknowledgement of the approval.

It is true that these Regulations relate to a variable measured in percent by volume corresponding to a definite numerical particle density which, therefore, as mentioned above, could be determined by a single measuring of quantity in a predetermined volume. However, according to another regulation[2], for taking into account a possible rarefaction of the exhaust gases by air, the content in carbon monoxide ($C_1$) and carbon dioxide ($C_2$) is to be measured. Then, the volume proportion to be compared with the specified limit value to be computed in accordance with the following formula:

$$C = 0.15 \frac{C_1}{C_1 + C_2}$$

A transformation of this equation to $$C = 0.15 \frac{C_1/C_2}{C_1/C_2 + 1} = \frac{4.5\%}{100}$$

shows that, in fact, a definite limit value of the concentration ratio, namely $C_1/C_2 = 3/7$, is specified, the testing of which with the conventional analytic methods requires two measurements.

[2] Annex 5, Article 3.2 (same reference)

In this case, for measuring the concentration with conventional apparatus, sampling devices, such as sampling probes, coolers, condensate separators and dust filters for purifying the sample gas, as well as a pump, are necessary. In contrast thereto, with the inventive method, such devices are not needed.

It is particularly advantageous to measure the ratio $I'/I''$, i.e. of the first derivative $I'$ to the second derivative $I''$, since this variant requires only one radiation receiver and one narrow-band interference filter, the transmission maximum of which is variable by a periodical variation of the angle of incidence about a fixed mean value, with a constant amplitude. The arrangements and circuits which are necessary, in this case, to obtain electric quantities and values which are proportional to the first derivative $I'$ or the second derivative $I''$, are well known. They are used, for example, in so-called "derivative spectrometry" to obtain a sharper spectral dispersion than with conventional methods which latter are based on the measuring of the "zero derivative". However, to the same extent as the zero derivative, the first and second derivatives cannot be used for a quantitative determination of the concentration of a component if this component is mixed with another component, which is also absorbing, in the spectral region of the measurement. Nor can the mixture ratio of two components be determined, in the by far greatest part of the spectrum, from the measured values of the first and second derivatives, since, in the major part of the spectral regions, they also depend on the amount of the total concentration. Surprisingly, however, the determination is successful in the vicinity of the mentioned absorption minima, that is, in a narrow region of the spectrum which, ordinarily, just is not used for quantitative examinations.

Figure 4:
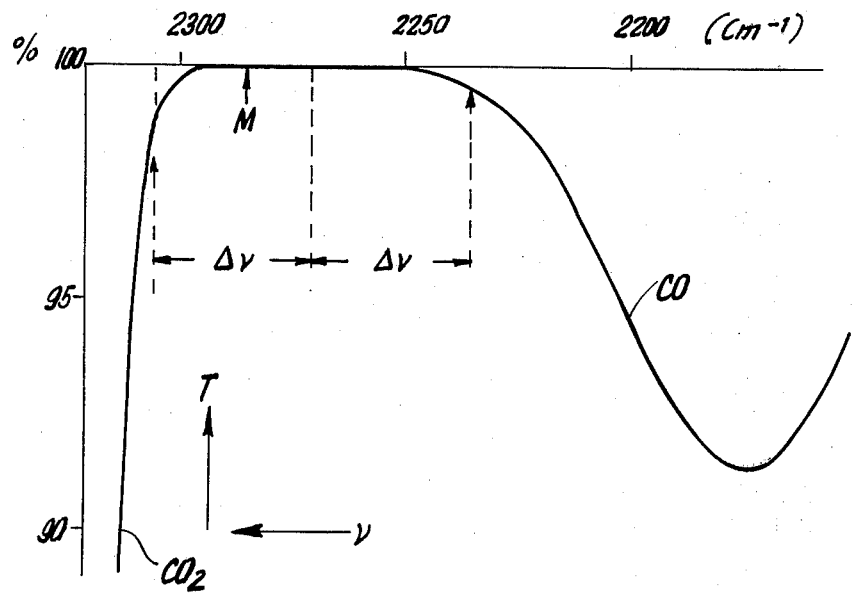
FIG. 4 is a graph illustrating the transmission curve of a $CO-CO_2$ mixture in a quantitative proportion exactly corresponding to a specified limit value.

To find this spectral region, a preliminary spectrometric examination was carried out in which the transmission curve of a CO–CO$_2$ mixture in a quantitative proportion exactly corresponding to the specified limit value of CO/CO$_2$ = 3/7 (see FIG. 4) has been measured. These two substances have adjacent absorption maxima at the wave numbers 2174 and 2337 cm$^{-1}$. A mixture of the two substances in the proportion of CO/CO$_2$ = 3/7 exhibits a relatively broad transmission maximum at the wave number 2285 cm$^{-1}$. In order to obtain a sufficiently strong signal for the measurement of the ratio $I'/I''$, i.e. the ratio of the first to the second derivative, a relatively large modulation amplitude of + 35 cm$^{-1}$ and a mean value of approximately 2270 cm$^{-1}$ was adjusted by means of a narrow-band interference filter of 2230 cm$^{-1}$, by a corresponding choice of the amplitude and mean value of the angle of incidence. Then, the radiation, transmitted by the gas mixture and falling on a radiation receiver, changed periodically its intensity depending on the quantities of carbon monoxide and carbon dioxide present in the path of rays. The current variations caused thereby in the radiation receiver were converted, in a well known manner, by phase-sensitive rectifiers, into electric quantities which were proportional to the first and second derivatives of the intensity of the spectral radiation in frequency. The value proportional to the firsts derivative was furnished by one of the rectifiers, the one operated at normal frequency, and the value proportional to the second derivative was furnished by a rectifier controlled by the double frequency of the modulation. Finally, with the aid of the known circuitry (modules), the measured value $I'/I''$ was obtained from the two values. Depending on whether a definite mixture proportion has been exceeded to one or the other side, a measuring instrument, having its zero point at the center of the scale, indicated positive or negative values serving as a measure for the deviation from this definite proportion.

Figure 6:
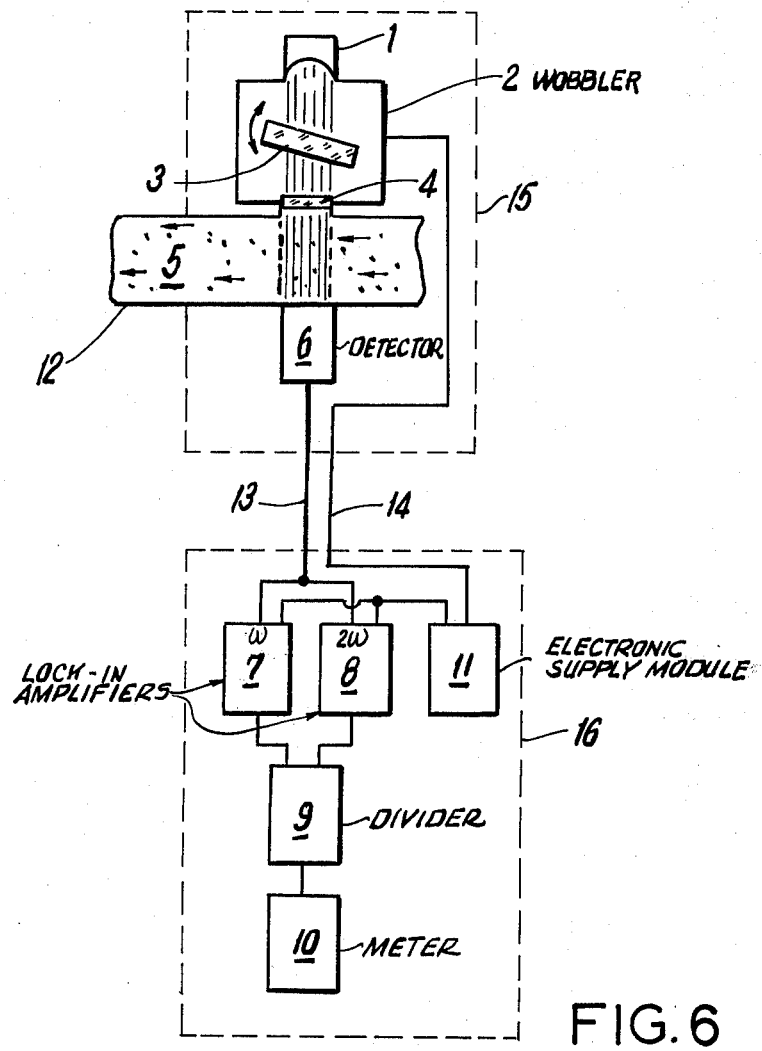
FIG. 6 is a schematic illustration of apparatus for performing the method of the invention.

Such a device is shown in FIG. 6 as consisting of two parts, namely the analyzer 15, where the measurement takes place, and the signal processor 16. Analyzer 15 and signal processor 16 are connected by an electrical cable including a cable element 14 supplying power to the measuring elements and a cable element 13 supplying the signal from analyzer 15 to signal processor 16.

Analyzer 15 consists of a light source 1 and a wobbler 2 where the wavelength of the light transmitted through an interference filter 3 is modulated with the frequency $\omega$ according to $$\lambda = \lambda o + \Delta\lambda \sin \omega t.$$

The mixture 5, to be analyzed, flows through a pipe 12 absorbing part of the light beam crossing the pipe 12. A window 4 protects wobbler 2 from dirt or dust. The intensity of the attenuated beam produces a signal in detector 6 connected by cable element 13 to signal processor 16.

This signal is fed simultaneously into two lock-in amplifiers 7 and 8, with the amplifier 7 being tuned to the fundamental frequency $\omega$ and the amplifier 8 being tuned to the first harmonic 2 $\omega$ of the modulation frequency. A divider 9, connected to the two amplifiers, processes the output of these amplifiers to generate the ratio of the two channels, corresponding to the ratio of the first and second derivatives of the attenuated light intensity with respect to wavelength. This ratio is displayed by meter 10. An electronic module 11 supplies power to analyzer 15 and to the processor elements, that is, to the light source, the wobbler motor, the detector, and the amplifier, as well as supplying the reference signal for the lock-in amplifiers 7 and 8.

Figure 5:
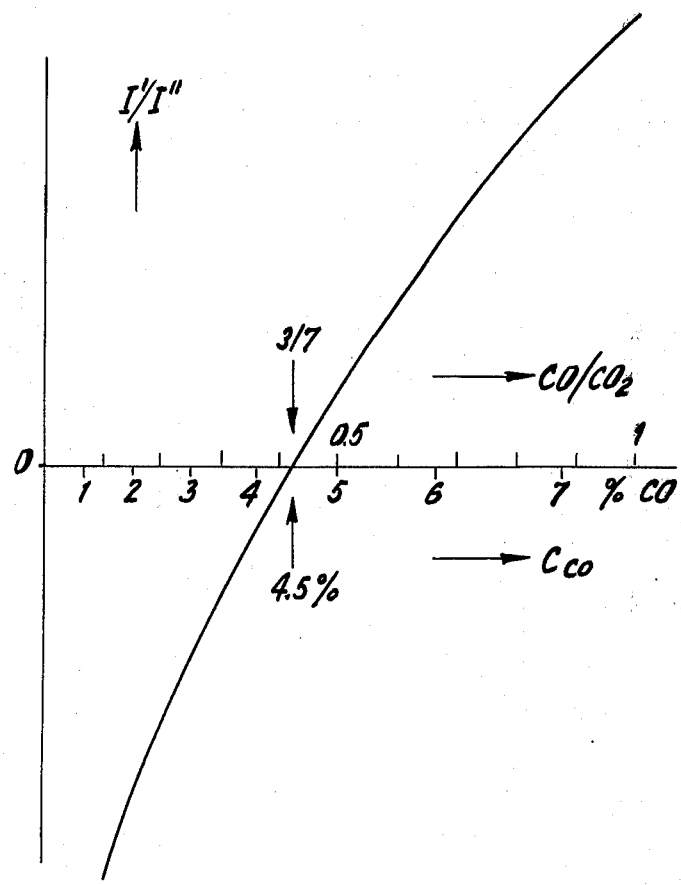
FIG. 5 graphically illustrates the relation between the measured values of the ratio of the first to the second derivatives and the $CO-CO_2$ proportion.

For adjusting the zero passage exactly to the specified limit value of $CO/CO_2 = 3/7$, upon equalizing the phase position of the rectifiers, initially, the zero point was adjusted without interposing the examined gas, by inserting an appropriate correction filter before the respective radiation source. Then, a gas mixture was interposed having a mixture proportion exactly corresponding to the specified limit value of $CO/CO_2 = 3/7$ and, by using the medium angle of incidence at the interference filter, the measured value I'/I'' was again adjusted to zero. Following this, several gas mixtures whose $CO/CO_2$ proportion was exactly known were examined. Therefrom, the relation shown in FIG. 5, between the measured values I'/I'' and the $CO/CO_2$ proportion, was found. In consequence, on the basis of this calibration curve, it has been possible to determine the $CO/CO_2$ proportion in unknown gas mixtures. The measurement is, in practice, independent of the absolute quantities of CO and $CO_2$ present in the beam path and, therefore, also of the rarefaction with air. It depends neither on the temperature nor on the pressure. The measurement is, in addition, largely independent of the intensity of the radiation source, as well as of smoke and dust. Therefore, neither gas cells nor dust filters, coolers, condensate separators or sampling devices are needed for the measurement. On the contrary, for example, in the mentioned application, the measuring beam may be provided directly behind the exhaust pipe of the vehicle to be tested. With the use of a simple circuit, even an acoustic signal may be produced upon exceeding the specified limit value.

There is attached hereto, as exemplary of the prior art, a list of literature references on derivative spectroscopy.

While specific embodiments of the invention have been shown and described in detail to illustrate the application of the principles of the invention, it will be understood that the invention may be embodied otherwise without departing from such principles.

What is claimed is:

1. A method of determining the concentration ratio of two components of a mixture of substances, having absorption bands which are adjacent each other in a manner such that the radiation absorption of the mixture of substances has a minimum between these absorption bands, comprising the steps of, in three adjacent, narrow, spectral regions of the radiation transmitted by the mixture of substances to be examined, measuring a single variable which is proportional to the ratio of $\Delta^1 I/\Delta^2 I$ wherein the numerator
$$\Delta^1 I = (I_3 - I_1)$$
is the difference between the intensities of radiation of the two outer spectral regions and the denominator
$$\Delta^2 I = (I_3 - I_2) - (I_2 - I_1)$$
is the value by which the difference between the intensities of radiation of one of the outer and the middle spectral regions and the difference between the intensities of radiation of the middle and the other outer spectral region differ from each other; using such variable as a measure for the concentration ratio; adjusting the position, in the spectrum, of the three adjacent regions so that they are located between the absorption maxima of the two components and that the numerator $\Delta^1 I$ becomes zero at a definite concentration ratio.

2. A method as claimed in claim 1, wherein said definite concentration ratio is the ratio at which the highest accuracy of measurement is desired.

3. A method of determining the concentration ratio of two components of a mixture of substances, having absorption bands which are adjacent each other in a manner such that the radiation absorption of the mixture of substances has a minimum between these absorption bands, comprising the steps of, measuring in the radiation transmitted by the mixture of substances to be examined a single variable which is proportional to the ratio of I'/I'', which is the ratio of the first derivative I' to the second derivative I'' of the distribution of spectral intensity; using such variable as a measure for the concentration ratio; and carrying out the measurement between the absorption maxima of the two components, at a location of the spectrum where, at a definite concentration ratio at which the first derivative I' becomes zero.

4. A method as claimed in claim 3, in which said definite concentration ratio is the ratio at which the highest accuracy of measurement is desired.

5. Apparatus for determining the concentration ratio of two components of a mixture of substances, having absorption bands which are adjacent each other in a manner such that the radiation absorption of the mixture of substances has a minimum between these absorption bands, by measuring a single variable, said apparatus comprising, in combination, containing means containing the mixture of substances; a light source operable to direct a beam of light across said containing means through the mixture of substances; a wobbler including an interference filter interposed in the beam of light; a detector adjacent said containing means operable to receive light transmitted across said containing means through the mixture of substances; first and second lock-in amplifiers having inputs connected in parallel to the output of said detector, said first amplifier being tuned to the fundamental frequency of said wobbler and said second amplifier being tuned to the first harmonic of the modulation frequency; a divider having inputs connected to the outputs of said first and second lock-in amplifiers; a meter connected to said divider; and a power supply connected to the components of said apparatus.

6. Apparatus as claimed in claim 5, in which said containing means is a conduit having said mixture of substances flowing therethrough.

* * * * *